June 3, 1958 A. P. VIRET 2,837,052
INDICATING APPARATUS
Filed Jan. 17, 1956

INVENTOR.
ANDRE P. VIRET
BY *Tyler L Roundy*

ATTORNEY

---

United States Patent Office 2,837,052
Patented June 3, 1958

---

2,837,052

INDICATING APPARATUS

Andre P. Viret, Ridgewood, N. J., assignor to Bendix Aviation Corporation, Teterboro, N. J., a corporation of Delaware Application January 17, 1956, Serial No. 559,603

1 Claim. (Cl. 116—129)

---

This invention relates to indicating apparatus and particularly to indirectly illuminated indicating devices and integral lighting arrangements for instruments wherein it is desired to illuminate indirectly both the indicia which is on a light-conducting dial and one or more indicator elements or pointers which are associated with the dial. The invention is especially applicable to indicating instruments suitable for use both in daylight and also in a darkened environment requiring so-called "night vision."

Heretofore, the conventional approach to the problem of providing satisfactory indirect illumination for indicating apparatus has involved the mounting of one or more lamps or light reflectors in corners provided in an instrument bezel in alignment with the edge of the transparent dial plate so that indirect illumination of the indicia is produced by light rays which enter the edge of the dial plate in radial directions and are internally transmitted and reflected through the transparent dial material so as to impinge upon the indicia, other light rays passing directly from the lamp across in front of the dial face so as to illuminate the pointer. Such a construction is disclosed for example in the copending application by myself and W. R. Polye, Ser. No. 351,856, filed April 29, 1953, now U. S. Patent No. 2,768,606 granted October 30, 1956, and assigned to the same assignee as the present application.

It has previously been proposed to encompass the dial face and the zone of operation of the pointer by a prismatic light-conducting ring which lies in a parallel plane in front of the dial face so that light rays introduced into the ring from in front of the dial pass from the ring radially inward across the dial face to illuminate the pointer, or to illuminate both the pointer and the dial face if the dial is opaque. Such constructions are disclosed and claimed for example in U. S. Patents 2,140,972 and 2,259,910 to G. V. Rylsky, granted December 20, 1938 and October 21, 1941, respectively, and assigned to the same assignee as the present application.

However, the mounting of lamps in a bezel in alignment with the edge of the dial has been found to be unacceptable in certain applications such as aircraft panel installations, since such lamp location increases the outside dimensions of bezel and casing. In one prior unit employing a prismatic edge portion or rim integral with the light-conducting dial plate and extending in front of the dial face, it was proposed to locate the lamp behind such edge portion so that illumination of the indicia and pointer was accomplished solely by those light rays from the lamp which entered the back of the edge portion, certain of these entering rays being reflected from the rim surface of the edge portion radially into the main body portion of the dial plate for internal transmission to illuminate the indicia, the balance of the entering rays being reflected from the rim surface radially inward across the dial face to illuminate the pointer, the rear of the dial being completely shielded by an opaque backing member so that no light would be permitted to enter the rear of the dial. In such prior arrangements, much of the light emitted from the lamps either is absorbed by the backing member or escapes in directions away from the dial and is absorbed and washed in the mechanism behind the dial, which places a distinct limitation upon the quantity of light rays available for illuminating the indicia and pointer with the intensity and uniformity required. Moreover, the fact that some of the light rays entering the prismatic edge portion are thereafter diverted for illuminating the indicia results in a further reduction in the quantity of light rays available for illuminating the pointer with the adequate intensity and uniformity required.

In my copending application Ser. No. 559,607, filed simultaneously with the present application, there is disclosed novel indicating apparatus wherein there is provided a dial structure of light-transmitting material including a main body portion having an opaque front dial surface which may be circular and which may be provided with light-transmitting indicia, and one or more pointers are disposed in front of the dial surface for cooperation with the indicia. The dial structure also includes a marginal lighting portion which may be annular and which extends ahead of the dial surface and is constructed so as to project a first group of received light rays out of the marginal portion across in front of the dial surface to illuminate the pointer, and there is provided means including one or more light sources located rearwardly of the main body portion with unobstructed straight-line paths therebetween for passing the first group of light rays into the marginal portion to illuminate the pointer and for passing a second group of light rays into the rear end surface of the main body portion for internal transmission therethrough to impinge upon and illuminate the indicia. In the specific constructions described in my copending application the rear end surface of the marginal lighting portion is arranged to receive the first group of light rays. For this purpose the rear end surface is made substantially coplanar with the rear end surface of the main body portion, and the lamps are supported on the side wall or rear end wall of the outer housing for the apparatus. Clearance space must be provided between such housing and the casing of the pointer actuating mechanism so that the lamps may project a second group of light rays through such space into the rear end surface of the marginal portion. Due to such clearance space necessarily required between the apparatus outer housing and the casing for the actuating mechanism, the resulting outside dimensions for the apparatus outer housing are larger than can be accommodated in some installations, and moreover, such clearance makes more difficult the problem of supporting the actuating mechanism centrally without intercepting the rays which must reach the rear of the marginal lighting portion and the rear of the main body portion. The constructions disclosed in the present application make it possible to eliminate clearance space between the outer housing for the apparatus and the casing for the actuating mechanism, and light waste is minimized. The subject matter of the present application is in the nature of an improvement over the specific constructions illustrated in my aforesaid copending application.

It is an object of the present invention to provide improved indicating apparatus.

It is another object of the invention to improve the illumination of indicating devices and particularly to improve indirect illumination or integral lighting for indicating apparatus.

It is another object of the invention to provide novel means for producing indirect illumination or transillumination of relatively high intensity or brightness for the indicia and indicator elements of indicating apparatus.

It is a further object of the invention to provide novel means for producing substantially uniform indirect illumination or transillumination for the indicia and indicator elements of indicating apparatus.

It is a further object of the invention to provide a novel self-contained indicating instrument having a relatively small outside diameter wherein the source or sources of illumination is located rearwardly of the dial surface for indirectly illuminating the dial indicia and indicator elements located in front of the dial face.

It is a still further object of the invention to provide a novel indicating instrument of relatively small outside diameter which does not incorporate an instrument bezel and may be clamped or otherwise directly mounted on an instrument panel in a compact arrangement along with a series of other similarly mounted instruments.

It is a further object of the invention to provide improved indicating apparatus wherein the dial indicia is illuminated from the rear of the dial and the pointer or other indicator member is indirectly illuminated by means of an auxiliary marginal lighting portion, the arrangement being such that little light is wasted and no clearance between the outer housing for the apparatus and the casing for the actuating mechanism is required as a prerequisite for illuminating the indicia and indicator member.

The foregoing and other objects, features and advantages of the present invention will become apparent hereinafter from a consideration of the detailed description which follows taken together with the accompanying drawing wherein one embodiment of the invention is illustrated by way of example.

In accordance with one aspect of the invention there is provided indirectly illuminated indicating apparatus comprising a dial structure composed of radiant energy-transmitting material, for example light-transmitting material, and having a main body portion with a front dial face which is for the most part impervious, for example opaque, to the radiant energy rays and which is apertured with indicia capable of passing or transmitting the rays of radiant energy, at least one indicator member or pointer disposed in front of the dial face for cooperation with the indicia, means for producing relative movement or relative rotation between the indicator member and the indicia, the dial structure having a marginal or peripheral lighting portion which may be annular and is provided with a prismatic extension which extends forwardly ahead or in front of the dial face and which is constructed, for example by selected beveling, so as to project a first group of received rays of radiant energy out of the marginal portion across in front of the dial face to strike the visible portions of the indicator member to illuminate the same, and means including at least one radiant energy source located rearwardly of or behind the main body portion and its dial face, with unobstructed straight-line paths between the source and the rear of the main body portion, for directing or causing the first group of rays to pass into the marginal portion of the dial structure for illuminating the indicator member and for directing or causing a second group of rays of radiant energy to pass into the rear of the main body portion for internal transmission through the main body portion so that such rays progress in a transverse generally axial direction and impinge upon or escape out through the indicia into the eyes of the observer, thereby illuminating the indicia.

In accordance with the present invention the radiant energy source or sources is positioned behind the main body portion and is spaced closer to the central longitudinal axis of the apparatus than is the marginal lighting portion, and the marginal lighting portion is provided with a prismatic extension which extends rearwardly of or behind the main body portion so as to pick up or receive the first group of radiant energy rays which pass outwardly in generally radial directions away from the central axis and which is constructed, for example by selected beveling, so as to direct the received first group of rays internally through the marginal lighting portion into the forward extension of the marginal lighting portion for projecting across in front of the dial surface to illuminate the indicator member or pointer. The light source or sources may be carried by the front end of the casing for the actuating mechanism, and if the rearward extension has a beveled surface the source may lie substantially in a plane which is normal to the central axis and which passes through the center of the beveled surface. Where design considerations require illumination of the indicator member with maximum intensity for example, the aforesaid dial structure may comprise an assembly of two or more members. Thus, the dial structure may include an indicia-bearing main dial member or dial plate of light-transmitting or light-conducting material and a separate marginal lighting member or lighting ring of similar material which has a forward extension extending ahead of the main dial member for projecting the first group of rays onto the indicator member and which has a rear extension extending rearwardly of the main dial member for picking up the first group of rays. Where other design considerations prevail, the marginal or peripheral portion and the main body portion may instead be integral parts of a unitary dial structure rather than separate members.

In the drawing wherein like reference characters refer to like elements throughout the various views, Fig. 1 is partial sectional view along the line 1—1 of Fig. 2 of one form of indirectly illuminated indicating instrument in accordance with the present invention;

Figure 1:
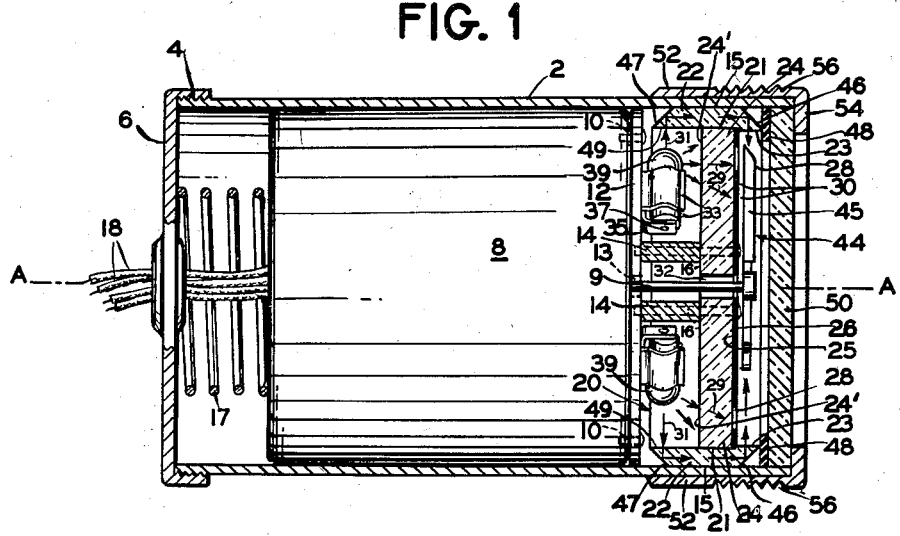
Figure 2:
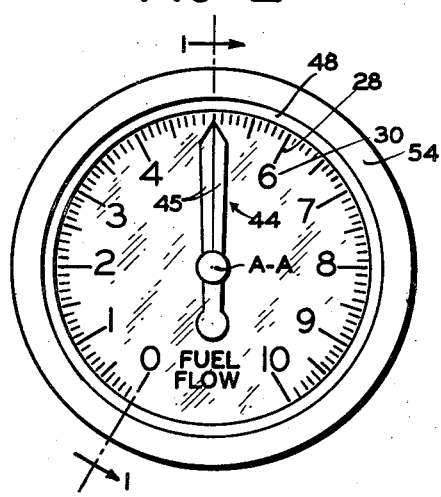
Fig. 2 is a front plan view of the instrument of Fig. 1.
Figure 3:
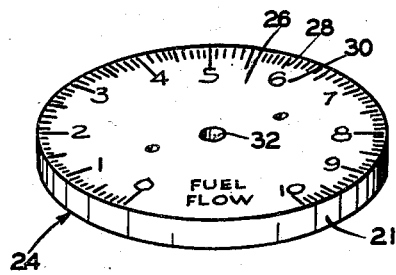
Fig. 3 is an isometric view of the dial structure of Figs. 1 and 2.
Figure 4:
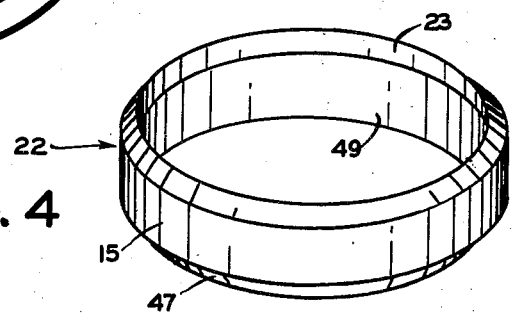
Fig. 4 is an isometric view of the auxiliary marginal lighting ring of Figs. 1 and 2.

Turning to Figs. 1 and 2, there is provided an indicator unit having a cylindrical metal housing 2 which is threaded at its rear end 4 to receive a threaded metal cover plate 6. Solder may be provided at 4 if an hermetic seal is desired. Fitted within the side wall of the housing 2 is the casing 8 of the actuating mechanism for the pointer or pointers. The actuating mechanism may be a conventional follow-up synchro device or conventional meter movement. Secured to the front end of casing 8 by screws 10 is a circular platform 12 of electrical insulation material. Threaded into platform 12 are two or more rigid posts 14 for supporting the dial structure indicated generally at 20.

As illustrated, the dial structure includes a marginal lighting portion in the form of a lighting ring 22 positioned radially by having its outer annular surface 15 fitted within the inner side wall of housing 2, and a main body portion in the form of a circular dial plate 24 having its outer annular surface fitted within the inner annular wall of ring 22 at 21. Ring 22 has an annular lip portion 23 which extends radially inward a slight amount beyond dial plate 24 to hold the dial plate and its attached assembly against axial movement in a forward direction. The dial plate may be secured to the posts 14 by means such as screws 16. The dial plate and mechanism assembly may be held or locked against rearward axial movement by suitable means. For example, spring means such as a compression spring 17 may be positioned between the cover plate 6 and the rear end of casing 8. Electrical connections 18 are passed hermetically through cover plate 6 for energizing the lamps and the actuating device inside casing 8.

Ring 22 and dial plate 24 may be composed of light-transmitting or light-conducting plastic material such as methyl methacrylate. For example, "Rexolite," "Lucite" or "Plexiglas" are suitable for this purpose. All surfaces of ring 22 are highly polished. The flat front surface 25 of dial plate 24 may be covered by a layer of translucent white paint which in turn is covered by a layer 26 of opaque paint or black printer's ink. The indicia, comprising the graduations 28, the numerals 30 and the legend "Fuel Flow," are cut out of the opaque layer 26 with the white paint exposed underneath so that the indicia are light-transmitting. Alternatively, the indicia may be cut or engraved in the front surface 25 of the dial plate and the resulting recesses may be filled with translucent white paint, the remaining flat surface being covered with a layer of opaque paint or printer's ink which may be applied by a roller so as to leave the white-painted indicia areas uncovered.

The actuating device in casing 8 rotates a shaft 9 which extends along the central longitudinal axis A—A of the indicator unit. Shaft 9 extends through a central aperture 13 provided in platform 12 and through a central aperture 32 provided in dial plate 24. Secured to the forward end of shaft 9 is a pointer 44 which may be composed of metal or of the same transparent plastic material as ring 22 and the dial plate 24. More than one pointer may be employed if desired. The pointer surfaces may be completely coated with a layer of white paint, and portions such as the tail end which are to be non-visible may be covered over with a layer of an opaque paint. The visible portions may have a triangular transverse cross-section with sloping or beveled surfaces 45.

Mounted on platform 12 are one or more lamp and socket assemblies. For the indicator unit illustrated in Figs. 1-4, three lamp and socket assemblies may be employed. Two of the three lamps are shown in Fig. 1 for the sake of simplicity. Each lamp socket comprises a pair of diametrically opposed metal spring clips 33 secured to platform 12 and serving as one electrical contact for engagement with the side body contact of the lamp. The second socket contact for engagement with the central contact pin of the lamp is provided by a right-angle metal spring 35 secured to platform 12. If desired, an aperture 37 may be provided in spring 35 and a rivet type socket contact may be supported in an insulation washer mounted in the aperture so that the rivet is insulated from the spring 35. For the sake of simplicity, the electrical connections to the socket contacts have been omitted at the sockets. The filament and envelope 39 of each lamp extend beyond the socket clips 33 for the lamp so as to project rays of light toward the dial structure in a manner which is about to be described. The filaments of the lamps may be equally spaced from each other and from the axis A—A. For example, the lamps may be arranged so that the central longitudinal axis of each lamp is tangential to an imaginary circle which is symmetrical about axis A—A.

As shown in Fig. 1, the lip portion 23 is part of a rim-like peripheral extension of the lighting ring 22 which projects ahead of the indicia-bearing dial surface and is provided with an annular 45° bevel surface 46. The bevel begins approximately at the plane which includes the opaque layer 26 or the dial face so that the bevel will not direct any light rays radially inward to escape and pass across at 21 into the body of dial plate 24 behind the dial face. In accordance with a feature of the invention the lighting ring 22 is provided with a second peripheral extension. This extension projects rearwardly of the dial plate 24 and is provided with an annular 45° bevel surface 47. In the embodiment illustrated the plane which includes the lamp filaments passes through the center of the annular bevel surface 47, thereby resulting in internal reflection from bevel 47 of a maximum number of the light rays which enter the annular inner surface portion 49 of the rearward extension.

In accordance with a feature the straight-line paths between the lamps and the annular rear surface portion 24′ of the dial plate behind the indicia are left unobstructed and the lamp filaments are spaced from the central axis A—A, for example approximately the same radial distance as are the indicia, in positions such that some of the light rays 29 from each lamp enter the rear dial surface 24′ approximately directly behind the indicia and are transmitted internally to progress in a transverse generally axially direction through the dial plate 24 so as to escape from the dial plate out through the light-transmitting indicia, thereby illuminating the indicia. At the same time the lamp filaments are positioned with respect to the rearward extension of ring 22 so that the remaining light rays from the lamps which are directed toward the dial assembly 20 are those rays 31 which are directed outwardly in generally radial directions and enter the lighting ring 22 by entering its annular surface portion 49 in the particular construction shown. The light rays 31 are internally reflected from the annular bevel surface 49 and in turn are transmitted internally through the ring until they strike the annular 45° bevel surface 46 from which they are internally reflected so as to be projected out of the annular exit surface 23 on the lip portion of ring 22 in generally radial directions inwardly across in front of the dial face and approximately parallel to the dial face until they strike the white-painted sloping surface 45 of the pointer 44 for reflection in a diffused manner into the eyes of the observer.

A flat metal ring 48 is sandwiched between the lighting ring 22 and the transparent cover glass 50 to serve as a spacer and also as a stray light shield to intercept rays of light which emerge in an oblique forward direction from the exit surface 23 toward the cover glass 50. Cover 50 may instead be composed of transparent plastic material if desired. Except for shield 48, such oblique rays would otherwise pass into the eyes of the observer as one type of glare. Where required, the inner rim portion of ring 48 may be bent at an oblique angle toward the dial surface. If desired, a second flat shield ring having approximately the same inside diameter as ring 48 may be positioned on the opaque layer 26 around the outer circumference of layer 26 so as to intercept those rays of light which emerge from the exit surface 23 in an oblique rearward direction toward the indicia and the background dial surface areas adjacent to the indicia, thereby casting a shadow across the indicia and indicia background to eliminate the type of glare which would otherwise result if such light rays were permitted to reflect from the indicia and indicia background into the eyes of the observer. Such a shield arrangement is disclosed in my aforesaid copending application Ser. No. 351,856, now U. S. Patent No. 2,768,606.

In order to provide an hermetic seal for the instrument a metal ring 52 is soldered to the housing 2 and is provided with a flange portion 54 which may be cemented or soldered to the cover glass 50. A series of annular grooves 56 are cut in ring 52 so that ring 52 is gripped tightly for support within the associated aperture in the instrument panel (not shown).

In the dial structure illustrated, the bevelled surfaces 46 and 47 for illuminating the pointer is formed on a lighting ring 22 which is a member separate from the dial member 24. Such construction is relatively simple to manufacture and assemble in the completed indicator unit. Also, since the engaging surfaces of ring 22 and dial plate 24 are not absolutely smooth, the physical contact at 21 is not perfect or complete. Since there is no appreciable optical contact between ring 22 and dial plate 24, a negligible number of the light rays 31 in ring 22 are permitted to escape into the side of the dial plate, which would otherwise diminish the number of light rays available for projecting across the dial face to illuminate the pointer with the intensity and uniformity required. However, where other considerations prevail, the lighting ring 22 with its bevel 46 may be integral with the dial plate 24, the resulting unitary dial structure having the same general outline as elements 22 and 24 shown in Fig. 1.

Although a specific embodiment of the invention has been illustrated and described in detail by way of example, it is to be expressly understood that the invention is not limited thereto. Various modifications are possible. For example, the lamp filaments may be spaced at a shorter radial distance from the central axis A—A than is the radial distance of the indicia from axis A—A, which increases the spacing between the lamps and the lighting ring 22, thereby reducing the heating effect of the lamps upon ring 22. Also, where illumination of the pointer with reduced intensity is permitted, the lamps may be located partially or completely rearward of ring 22 as long as a predetermined number of light rays are able to enter surface portion 49 to be reflected internally from the bevel surface 47 and in turn from the bevel surface 46. Only a few arrows have been shown to illustrate representative light rays. Moreover, selected areas on the rear surface 24' behind the indicia may be roughened or painted white or supplemented by auxiliary pieces of light-conducting plastic material to diffuse the more intense light rays nearer the lamps so as to provide a more uniform illumination of the indicia. Also if desired, an auxiliary flat lighting plate of light-conducting plastic material may be positioned adjacent to the rear surface 24' of dial plate 24 and the lamps positioned so as to direct the light rays through such auxiliary lighting plate in generally radial directions, the areas of the rear surface of such auxiliary lighting plate behind the indicia being treated or painted white so as to diffuse or reflect the light rays corresponding to rays 29 internally in generally axial forward directions into the dial plate for internal transmission therethrough to illuminate the indicia while other light rays from the lamps corresponding to rays 31 pass into the lighting ring to illuminate the pointer. Such auxiliary lighting plate arrangements are disclosed for example in the copending application of G. C. Sturges, Ser. No. 282,639, filed April 16, 1952, now U. S. Patent No. 2,768,605, granted October 30, 1956, and the copending application of G. S. Hunter and G. C. Sturges, Ser. No. 572,158, filed March 16, 1956, as a continuation-in-whole of later abandoned application Ser. No. 251,614, filed October 16, 1951, the aforesaid patent and applications being assigned to the same assignee as the present application. For purposes of illustration and simplification various shapes and relative dimensions and locations of parts have been exaggerated. Various changes may be made in the design and arrangement of parts without departing from the spirit and scope of the invention as defined by the appended claim as will now be understood by those skilled in the art.

I claim:

Indicating apparatus comprising a housing having a generally cylindrical portion, a dial structure mounted inside said housing and including a ring-like lighting member of light-conducting material having an annular inner surface and having an annular outer surface fitted within said cylindrical portion of the housing, said dial structure also including a separate generally cylindrical dial plate of light-conducting material having an annular outer surface fitted within said inner annular surface of said lighting member, said dial plate having a central aperture along the central axis of the apparatus and an opaque front dial face apertured with light-transmitting indicia, at least one pointer having portions to be illuminated which are disposed in front of said dial face for cooperation with said indicia, means including a shaft extending axially through said aperture for rotating said pointer with respect to said indicia, said lighting member having a rear portion with an inner annular surface and with a 45° beveled rear outer annular surface extending rearwardly of said dial plate and obliquely towards said axis, said lighting member also having a forward portion with an inner annular light-projecting surface which extends axially ahead of said dial face to encompass substantially said pointer, said forward portion of the lighting member having a 45° beveled forward outer annular surface, said last-mentioned bevel beginning approximately at the plane including said dial face and at said cylindrical portion of the housing to reflect light rays received in said lighting member out across in front of said dial face to impinge upon said portions of the pointer to be illuminated, and a plurality of lamps positioned behind said dial plate and spaced from said central axis approximately the same distance as said lighting member and said indicia for passing a first group of light rays into said inner annular surface of said lighting member for internal reflection from said beveled rear surface to impinge upon and internally reflect from said beveled forward surface to illuminate said pointer and for passing a second group of light rays into the portions of the rear of said dial plate approximately directly behind said indicia for internal transmission through said dial plate to illuminate said indicia.

References Cited in the file of this patent
UNITED STATES PATENTS

| | | |
|---|---|---|
| 2,287,605 | Dickson | June 23, 1942 |
| 2,606,277 | Triplett | Aug. 5, 1952 |
| 2,637,296 | Colt | May 5, 1953 |